United States Patent
Gallo et al.

[11] 3,887,084
[45] June 3, 1975

[54] WORKPIECE TRANSFER DEVICE FOR PRODUCTION MACHINES

[75] Inventors: Sam Gallo, Flint; James R. Pennington, Clio, both of Mich.

[73] Assignee: General Motors Corporation, Detroit, Mich.

[22] Filed: Apr. 23, 1973

[21] Appl. No.: 353,561

[52] U.S. Cl............................. 214/1 BB; 214/1 BC
[51] Int. Cl............................................ B65g 47/04
[58] Field of Search...... 214/1 B, 1 BB, 1 BC, 1 BT, 214/1 BH, 1 BD, 1 BV

[56] References Cited
UNITED STATES PATENTS

| | | | |
|---|---|---|---|
| 2,974,811 | 3/1961 | Dammert | 214/1 BC |
| 3,232,451 | 1/1966 | Andren | 214/1 BB |
| 3,406,837 | 10/1968 | Kirsch | 214/1 BH |
| 3,581,911 | 6/1971 | Folk | 214/1 BH |
| 3,757,963 | 9/1973 | Binkley | 214/1 BC X |

*Primary Examiner*—Robert J. Spar
*Assistant Examiner*—George F. Abraham
*Attorney, Agent, or Firm*—Charles R. White

[57] ABSTRACT

In this device an arm having side-by-side workpiece holding chucks is slidably and pivotally mounted on a supporting shaft which is turned by a motor to pivot the arm into and out of a production machine from and toward a workpiece loading-unloading station. At a first position in the machine the arm tracks linearly on the shaft so that a first chuck picks up a finished workpiece from the machine. Subsequently, the arm indexes to a second position in the machine and tracks linearly on the shaft so that a second chuck deposits an unfinished workpiece into the machine prior to the return to the loading-unloading station for recycling.

2 Claims, 6 Drawing Figures

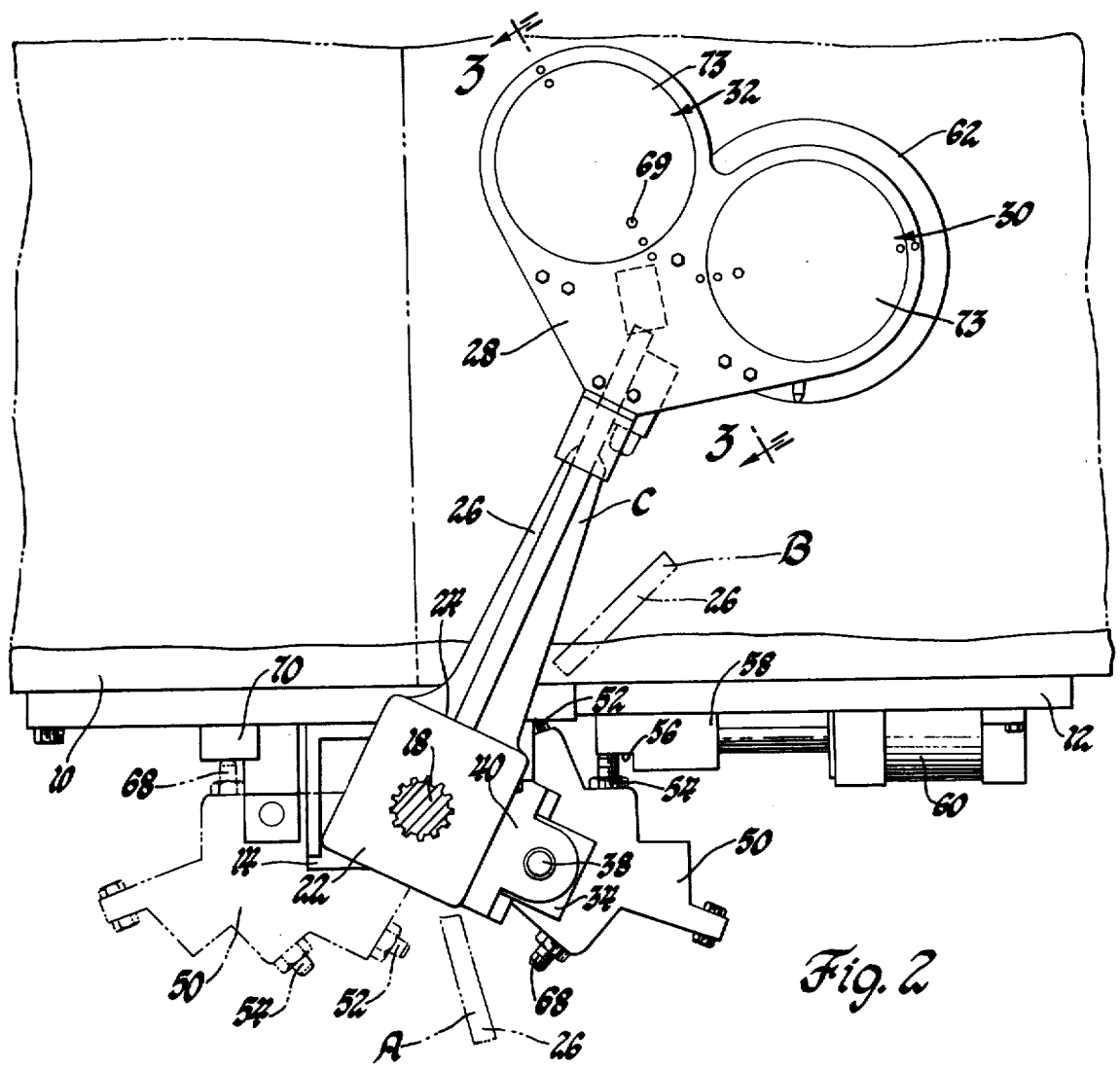

WORKPIECE TRANSFER DEVICE FOR PRODUCTION MACHINES

This invention relates to workpiece transfer devices and more particularly to a new and improved workpiece loading-unloading device incorporating a pair of workpiece holding chucks mounted on a pivotal and sliding arm which sequentially indexes the chucks into alignment with a machine chuck and tracks vertically to unload and load the machine prior to return to a predetermined station.

Many production machines such as gear shapers, which incorporate an oscillating workpiece support table for stroking the workpiece during a work operation, are provided with special braking devices to stop the table at a precise location. This precise braking allows the prior workpiece transfer device to enter the machine and extract a finished workpiece therefrom. After removal of the finished workpiece, the transfer device again enters the machine to load it with an unfinished workpiece and subsequently retracts therefrom so the machine can perform work on the loaded part.

In addition to requiring special brakes for the oscillating workpiece table for these production machines, the prior transfer devices frequently could not load and unload high capacity production machines at a sufficiently high rate so that overall production efficiency was reduced.

In this workpiece transfer device, there is a horizontally extending arm that has both pivotal and sliding capabilities which allow chuck means secured thereon to align with and track a vertically oscillating machine chuck, to extract a finished part therefrom, to subsequently index to a position to track and load the oscillating machine chuck with an unfinished workpiece, and finally to move out of the machine to deposit the finished workpiece at a discharge station and pick up an unfinished workpiece at the station for subsequent loading into the machine. With this new and improved transfer device special braking mechanisms are not required for positioning machine chucks for loading and unloading, transfer of parts into and out of the production machine is quicker and more efficient as compared to prior transfer machines and overall production efficiency is improved.

It is an object, feature and advantage of this invention to provide a new and improved workpiece transfer device incorporating a slidable and pivotal loader arm that has a pair of side-by-side workpiece holding chucks which are sequentially indexed into a production machine to track a vertically oscillating machine chuck to remove the finished workpiece therefrom and load a new part therein prior to movement of the arm out of the machine carrying the finished workpiece therein.

Another feature, object and advantage of this invention is to provide a new and improved workpiece transfer device in which a pivotal and slidable arm carries a pair of workpiece holding chucks at one end thereof for transporting an unfinished workpiece into the machine loading a vertically movable chuck with a workpiece at any position of the chuck and transferring a finished workpiece out of the machine.

Another object, feature and advantage of this invention is to provide a new and improved workpiece transfer device which incorporates a horizontally extending arm that is slidably and pivotally mounted on supporting means and which carries workpiece holding chucks. These chucks are sequentially indexed into a production machine to track a vertically movable workpiece support table which stops at various positions and remove a finished workpiece therefrom and load a new workpiece therein prior to movement of the arm out of the machine with a finished workpiece held thereby.

These and other features, objects and advantages of this invention will become more apparent from the following detailed description and drawings in which:

FIG. 2 is a top plan view of the preferred embodiment of this invention;

FIG. 3 is a cross-section view taken generally along the lines 3—3 of FIG. 2;

Figure 1:
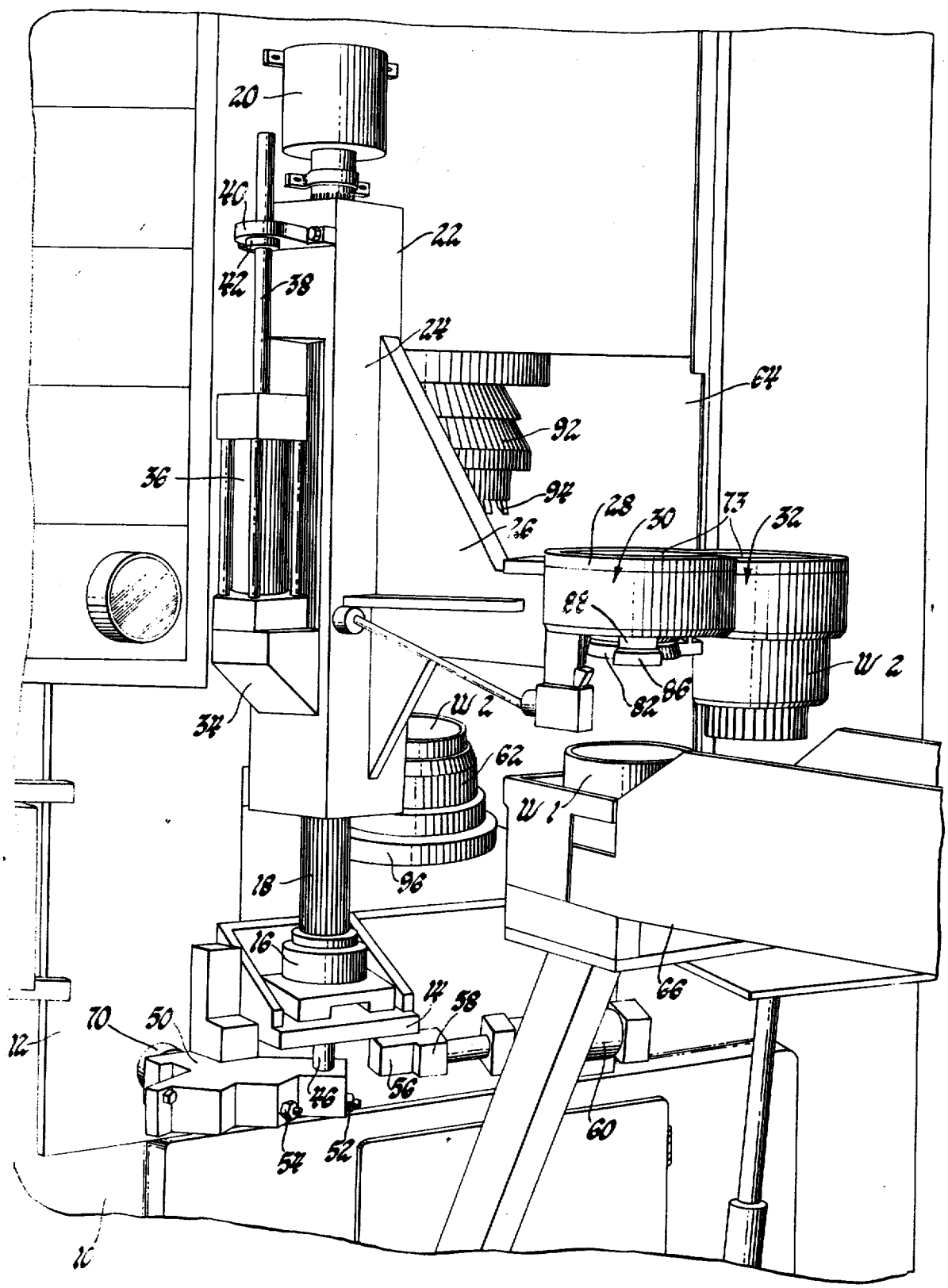
FIG. 1 is a perspective view of a preferred embodiment of this invention.

As shown in FIG. 1, there is a base 10 having a vertically extending support plate 12 secured thereto. Extending horizontally from plate 12 is a bracket 14 on which there is fixed a pedestal 16 that rotatably supports an elongated and vertically extending splined shaft 18. The upper end of the splined shaft 18 is drivingly connected to the output of a hydraulic motor 20 which is fixed to plate 12 and which turns the splined shaft clockwise or counterclockwise by actuation of controls which will be later described.

Mounted on the splined shaft 18 is a carriage 22 which has a front plate 24 that carries a horizontally extending arm 26. Disposed at the outer extremity of arm 26 is a connector plate 28 that carries a pair of pneumatically operated chucks 30 and 32 which are used to grip and release cylindrical workpieces W1 and W2.

Secured to an intermediate portion of the splined shaft 18 is a support block 34 on which is mounted a vertically-extending hydraulic cylinder 36 having piston rod 38 extending upwardly therefrom. Piston rod 38 slidably extends through a pillow block 40 that is fixed to the upper end of carriage 22. A contact block 42 fixed to piston rod 38 below the pillow block 40 engages the pillow block on the upward stroke of the piston of the cylinder to move the carriage 22 upwardly on the splined shaft 18 to thereby raise chucks 30 and 32. When the piston strokes downwardly the carriage 22 acted upon by the force of gravity moves downwardly following contact block 42. The controlled exhaust of pressure fluid from cylinder 36 provides for the calibrated and cushioned return of the carriage to its lower position.

The splined shaft 18 terminates in a cylindrical lower part 46 that extends through pedestal 16 and bracket 14 into driving engagement with a stop block 50 so that it moves with the splined shaft 18 as it is turned by motor 20. The stop block is stepped as shown and carries on its front steps first and second stops 52 and 54 that engage the contact end 56 of a movable slide 58 which is slidably mounted on tracks fixed to the front of plate 12. This slide is moved by hydraulically operated cylinder 60, fixed to plate 12, between an extended position where contact end 56 of the slide is in arcuate alignment with the first stop 52 and a retracted position where the contact end 56 is in arcuate alignment with stop 54.

These stops serially position chucks 30 and 32 over workpiece holding chuck 62 of the gear shaping machine 64 when the arm 26 is turned from side-by-side workpiece feed and discharge chutes 66 into the gear shaping machine 64. Secured to the back face of the stop block 50 is a third stop 68 which is adapted to contact a stop block 70 fastened to the front of plate 12 to position the chucks 30 and 32 over the workpiece feed and discharge chutes 66 when arm 26 is turned out of machine 64. The three positions described above are illustrated in FIG. 2 as positions A, B and C. In position A the chucks 30 and 32 are over and respectively aligned with the side-by-side feed and discharge chutes 66. In position B chuck 32 is over and aligned with machine chuck 62 while in position C the chuck 30 is over and aligned with machine chuck 62.

FIG. 3 shows details of chuck 32 which incorporates a drum-like housing 71 secured by screws 69 to an upper annular plate 73. As shown, plate 73 is fastened by screws 72 to a support member 75 for workpiece gripping means which will be later described. This support member is in turn secured to connector plate 28 by screws 77. Operatively disposed inside of housing 71 is a pneumatically operated piston 74 that strokes downwardly when expansible chamber 76 formed above the piston 74 is pressurized from a suitable source, not shown. When pressure is exhausted from chamber 76, return springs 78 disposed in spring pockets 80 in the piston 74 and cover 71 stroke the piston upwardly. This piston action causes the gripping and release of the workpiece W1 and W2 by the chucks as further described below.

As shown in FIGS. 1 and 3, the piston 74 carries a conical shaped cam 82 fixed with the bottom thereof by screws 83. The conical side walls of cam 82 mate with the conical inner edges 84 of the workpiece gripping heads 86 that are connected to support member 75 by spring-like fingers 88. Normally, the spring fingers bias the heads 86 radially inwardly from gripping engagement with the interior side wall of the particular workpiece W1 or W2 so that, in the lower position of the piston, the workpiece is not held by the chuck. When the piston 74 and cam 82 stroke upwardly by operation of spring 78 in response to release of pressure from chamber 76, the gripping heads 86 are wedged radially outwardly into gripping engagement with the interior wall of the workpiece W1 or W2.

Figure 4:
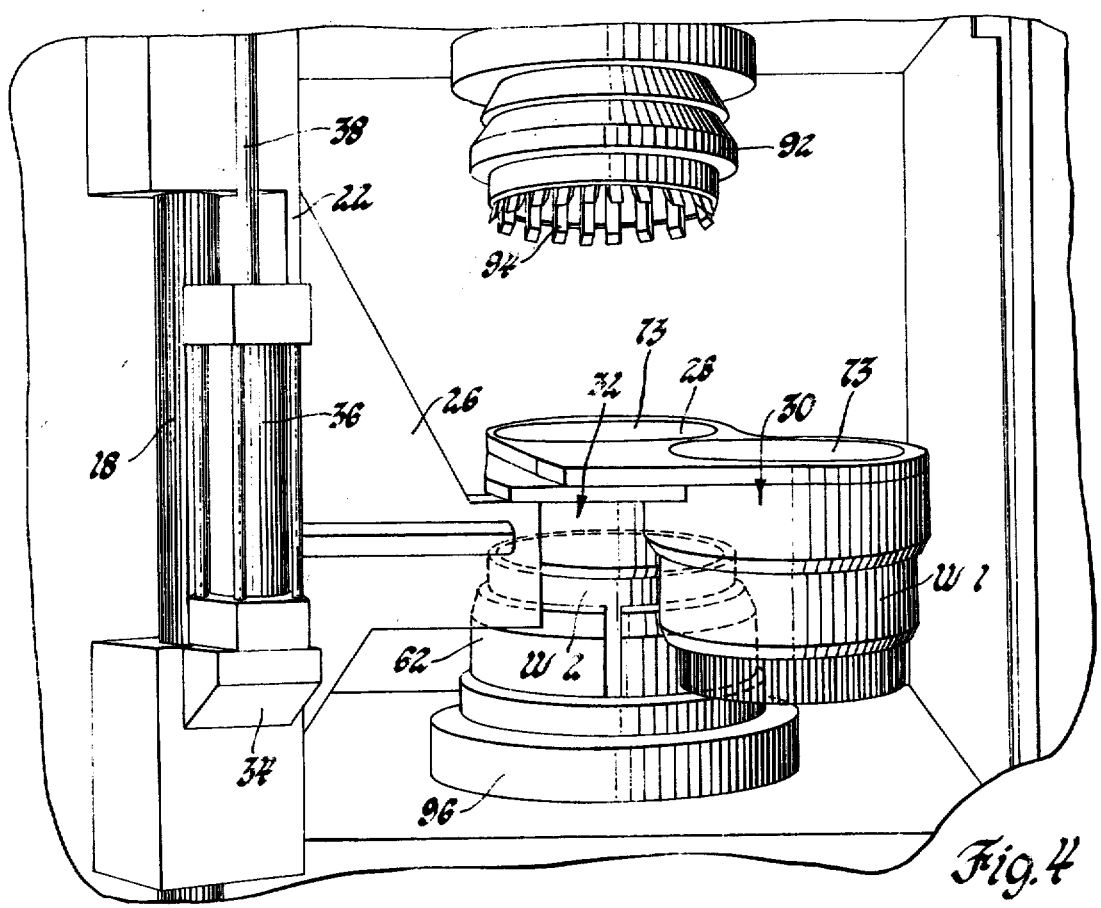
FIGS. 4 and 5 are perspective views of the preferred embodiment of this invention illustrating an operation thereof.
Figure 5:
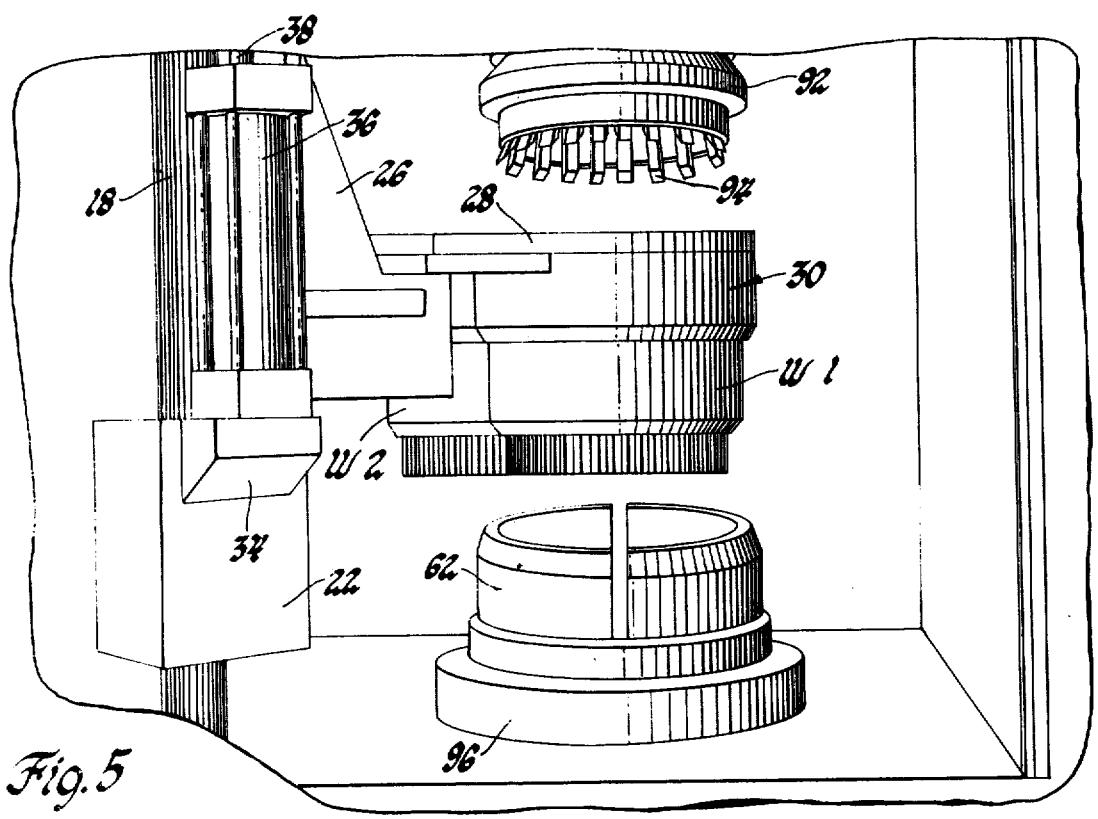

The illustrated machine 64 is a gear shaper which has a cutting head 92 that can be raised and lowered with respect to chuck 62. The cutter head is provided with cutting teeth 94 which, when the head is lowered into contact with the workpiece W1 and the machine activated, cut into and make splines in the interior walls of the unfinished workpiece securely held in the machine chuck 62. The machine chuck 62 is seated on a table 96 which vertically oscillates during operation to provide the stroke for forming the splines in the workpieces held therein. No special brakes are used with this machine chuck which can stop at any position or even remain in oscillatory motion while being loaded and unloaded. For example, in FIG. 4 arm 26 has been turned from the feed and discharge chutes 66 to position B within the machine. Arm 26 is tracked downwardly so that chuck 32 engages the workpiece W2 in the vertically oscillating chuck 62 to pick up a finished workpiece W2 therefrom. In FIG. 5 the arm 26, after being elevated from the FIG. 4 position, is shown as indexed over to position C where chuck 30 is aligned vertically with the machine chuck 62 so that it can be tracked downwardly to feed the machine chuck with workpiece W1 at any position of the machine chuck.

Figure 6:
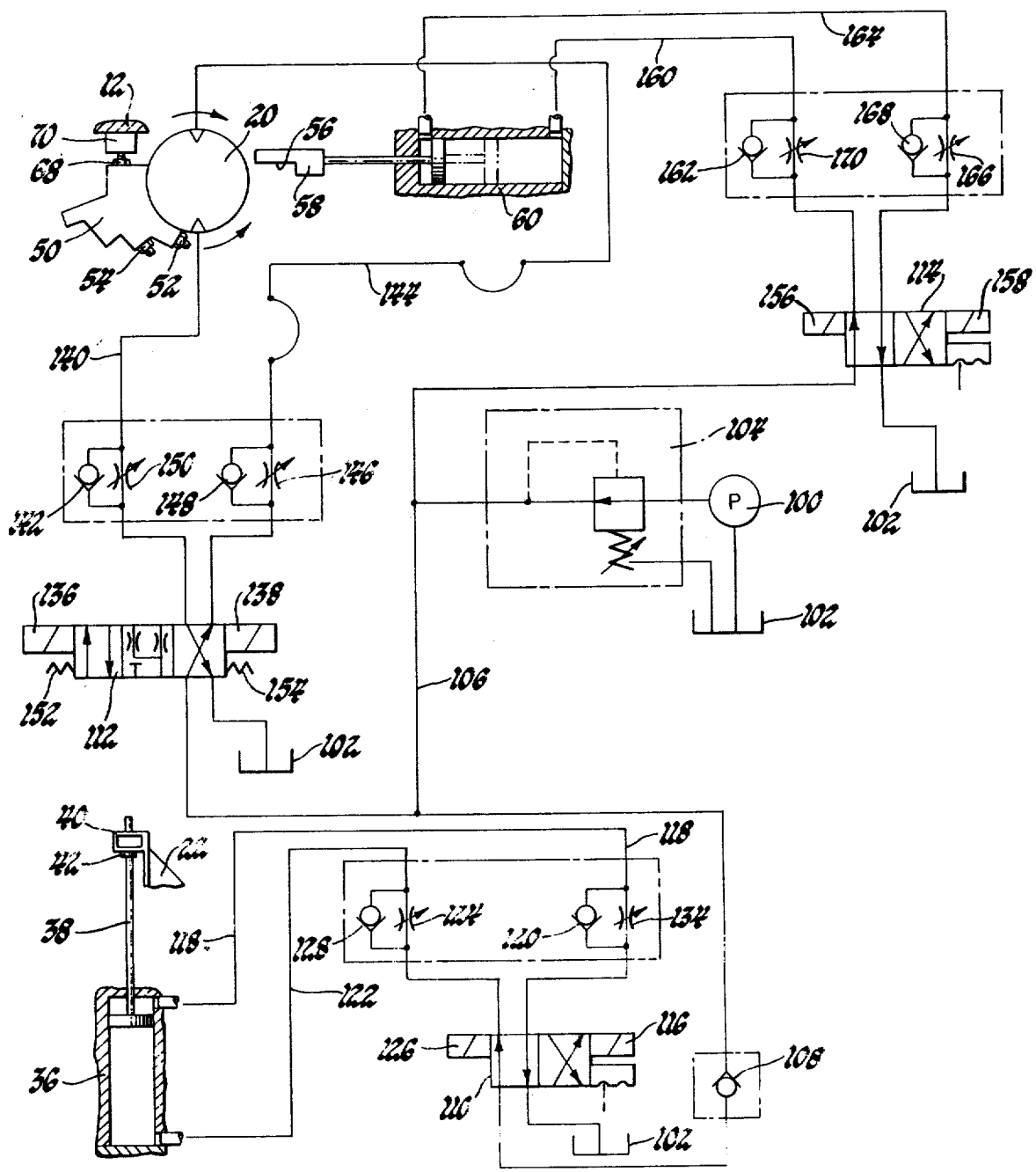
FIG. 6 is a diagrammatic view of controls of the preferred embodiment of this invention.

In FIG. 6, hydraulic controls are diagrammatically illustrated which may be utilized to operate the loader of FIGS. 1–5. These controls comprise a hydraulic pump 100 that pumps fluid from sump 102 through a pressure compensating valve 104 to main line 106. Main line 106 is hydraulically connected through a check valve 108 to a control valve 110 for elevating and lowering cylinder 36. As shown, the main line 106 is also hydraulically connected to control valve 112 for hydraulic motor 20 and to control valve 114 for hydraulic cylinder 60 which will be later described. The control valves are shifted by any suitable means such as by electrically energizable solenoids which will be described below.

When solenoid 116, connected to one side of valve 110, is energized the valve 110 shifts to the left from the illustrated position so that regulated pressure fluid is fed from main line 106 through valve 110, one-way ball check valve 120 and line 118 into the top of cylinder 36 to stroke the piston therein downwardly. The carriage 22 and connected chucks 30 and 32 follow the downward movement of the piston of cylinder 36. Fluid discharged from the bottom of the cylinder exits through line 122, flow control restriction 124 and valve 110 to the sump 102. By exhausting fluid through variable restriction 124, the piston of cylinder 36 is gradually retracted and the carriage is smoothly lowered to its bottom position shown best in FIG. 4. When solenoid 126 at the other end of valve 110 is energized, and with solenoid 116 deenergized, the valve 110 is moved to its illustrated position so that pressure fluid from line 106 is fed to the bottom of cylinder 36 through valve 110, one-way ball check valve 128 and line 122. Under these conditions the piston in the cylinder will extend so that contact block 42 engages pillow block 40 to raise the carriage 22. Fluid exiting from the top of the cylinder will be fed by line 118, variable restriction 134 and valve 110 to the sump 102. The ball check valves 120 and 128 are disposed in parallel with the adjacent flow control restrictions 134 and 124 and respectively seat when fluid is discharged through lines 122 and 118 so that all discharge is through a flow control restriction.

The control valve 112 for the hydraulic motor 20, used to turn the carriage and arm 30 into and out of the machine, is controlled by electrically energizable solenoids 136 and 138. When solenoid 136 is energized and solenoid 138 deenergized, the control valve 112 shifts to the right so that pressure from line 106 is fed into the hydraulic motor 20 through line 140, and the one-way check valve 142. Fluid discharged by the motor 20 is routed through line 144, restriction 146, and valve 112 back to the sump 102. By this action the motor 20 is activated and turns the carriage 22 counterclockwise into the machine until the stop 50 is contacted by the contact end of the stop block.

When only solenoid 138 of the two solenoids is energized, the valve 112 is shifted to the illustrated position to reverse the flow of fluid through the motor 20 so that it turns the carriage 22 out of the machine. Under these conditions, pressure fluid from line 106 is fed through the valve 112, the one-way check valve 148 to motor 20. Fluid exiting from motor 20 passes through line 140, restriction 150, through valve 120 back to the sump 102. The ball check valves 142 and 148 are functionally the same as those previously described and further detailed description of their operation to establish exhaust flow through the restrictions is not needed.

When both solenoids are deenergized, springs 152 and 154 at opposite ends of valve 112 center the valve so that flow into the motor 20 is blocked and the lines 140 and 144 are open to the sump to release the pressure from motor 20. During this time the stop cylinder 60 can be activated to retract the slide 58.

Valve 114 controls the position of the stop slide 58 and has solenoids 156 and 158 at either end. When solenoid 156 is energized, the valve 114 shifts to the right so that pressure from line 106 is fed into line 160 through ball check valve 162 to the piston extension side of the cylinder 60. Line 164 on the other side of the piston feeds pressure through restriction 166 since ball check valve 168 is seated and valve 114 back to sump 102. When this occurs, the cylinder 60 will be charged with pressure so that the piston therein is extended to the full line position to align the contact end 58 of the slide with stop 52. Under these conditions motor 20 can turn arm 22 counterclockwise from position A to position B.

When solenoid 158 is subsequently energized the valve 114 shifts to the left so that pressure from line 106 is fed into line 164 through valve 114 and one-way ball check valve 168 to the piston retraction side of cylinder 60. Line 160 on the other side of the piston of cylinder 60 feeds pressure through restriction 170, since ball check valve 162 is seated, valve 114 back to sump 102. This causes the piston in cylinder 60 to retract to the phantom line so that arm 22 can be indexed counterclockwise from position B to position C of FIG. 2 with chuck 30 vertically aligned with machine chuck 62.

In operation the arm 26 is initially disposed above the feed and discharge chutes 66 and assuming that the machine has finished working on a part W2 in machine chuck 62 the following transfer cycle occurs: First the hydraulic motor 20 is activated by valve 112 and the arm is rotated counterclockwise into the machine until the arm is in position B and empty chuck 32 is in vertical alignment with the machine chuck 62. This position is established by charging the cylinder 60 to extend slide 58 into alignment with stop 52. The cylinder 36 is then exhausted so that the arm 26 tracks downwardly into the FIG. 4 position. In this position chuck 32 engages the workpiece W2 which has been internally splined by cutting head 92 of the machine and without braking of the vertically oscillatable table 96. After the part W2 has been gripped by the chuck 32 the cylinder 36 is charged to raise the arm 26 with the finished workpiece W2 held in chuck 32. At this time valve 112 is neutralized to take the pressure load off of motor 20 so that there is no turning force present in this hydraulic unit. The stop cylinder 60 is then energized to retract the piston in the stop cylinder so contact end 56 of the slide aligns with stop 54. Control valve 112 is again moved to a position so that the motor 20 is energized to cause further rotation of the arm 26 and to the position C whereby the second stop 54 engages the contact end of the slide 58. In this second position of the arm 22 shown in FIG. 5, chuck 30 is vertically aligned with the machine chuck 62. The cylinder 36 is then exhausted so that the arm 26 will stroke downwardly whereby the unfinished workpiece W1 is placed in the machine chuck 62. The air pressure operated chuck 30 is then energized to release the workpiece W1.

After workpiece W1 has been deposited in the machine chuck 62, arm 26 is raised upwardly by operation of cylinder 36. After this, motor 20 is fed with pressure fluid from the control valve 112 so that it turns the shaft 18 and connected arm 26 clockwise into position A and in alignment with the feed and discharge chutes, respectively. The arm 26 will be tracked downwardly so that finished workpiece W2 is released by chuck 32 and a new workpiece W1 engaged by the chuck 30; subsequently, arm 26 will track upwardly for the start of a new loading cycle after the machine has finished work on the workpiece in chuck 62.

It will be understood that this invention is not limited to the details of the preferred construction shown and described for obvious modifications will now occur to those skilled in the art.

We claim:

1. A device for cycling workpieces between a workpiece loading-unloading station into and out of a machine having vertically oscillating workpiece support means therein comprising a single horizontally extending arm, a support plate secured to one end of said arm, separate and independent first and second workpiece holding chuck means for independently gripping and holding first and second separate workpieces, securing means for fastening said chuck means in a side-by-side relationship on one end of said arm, each of said chuck means extending vertically from said support plate and each having opposing workpiece gripping means relatively movable toward and away from one another for selectively releasing and gripping separate first and second workpieces, vertically-extending track means supporting said arm for movement in a vertical direction and for clockwise and counterclockwise turning movement into and out of said machine, first motor means for vertically moving said arm and said first and second chuck means to predetermined positions with respect to said track means, a pivot axis, means mounting said track means for turning movement with respect to said pivot axis, second motor means for turning said track means and said arm with respect to said pivot axis, first stop means operatively connected to said track means for stopping the turning movement of said track means and said arm in a first rotary direction at a first station within said machine whereby said arm and a first of said chuck means can be vertically moved on said track means to pick up a finished workpiece from said workpiece support means from any vertical position thereof, second stop means operatively connected to said track means for stopping subsequent turning movement of said track means and said arm in said first rotary direction at a second station within said machine whereby said arm and said second of said chuck means can be vertically moved on said track means to load an unfinished workpiece onto said workpiece support means, and control means for subsequently effecting the turning movement of said track means and said arm in a second rotary direction opposite to said first rotary direction to move said finished workpiece out of said machine toward said loading-unloading station, and third stop means operatively connected to said track means for limiting the turning movement of said track means and said arm to a position vertically aligned with said loading-unloading station so that said first chuck means can unload finished workpiece and simultaneously said second chuck means can be loaded with an unfinished workpiece.

2. A workpiece transfer device for transferring workpieces between a workpiece loading-unloading station and a vertically oscillating workpiece support means arcuately spaced from said station in a machine comprising a single horizontally-extending arm means movable in vertical and rotary directions with respect to an axis, said arm means having a pair of side-by-side workpiece holding chucks operatively secured on one end thereof, each of said chuck means being operatively independent of each other and each having a pair of relatively movable workpiece gripping means for separately gripping first and second workpieces, vertically extending track means extending along said axis supporting said arm means for vertical and rotary movement with respect to said axis, first motor means operatively connected to said arm means for raising and lowering said arm means on said track means to thereby raise and lower said chucks to predetermined positions with respect to said track means, second motor means operatively connected to one end of said track means for turning said track means and said arm means in clockwise and counterclockwise directions with respect to said axis, linearly movable blocking means supported by the machine for limiting the turning movement of said track means in one of said directions, first stop means operatively connected to the other end of said track means engageable with said blocking means in one position thereof for limiting rotation of said track means and said arm means in a first rotary direction to a first position whereby a first of said chucks is vertically aligned with said workpiece support means of said machine so that said arm means can be lowered and said workpiece gripping means thereof grips a finished workpiece on said workpiece support, second stop means offset from said first stop means engageable with said blocking means subsequent to the predetermined linear movement of said blocking means for limiting subsequent rotation of said track means and said arm means in said first rotary direction so that a second of said chucks is vertically aligned with said workpiece support means of said machine and so that said arm means can be lowered and said workpiece gripping means of said second chuck unloads an unfinished workpiece onto said workpiece support, and third stop means for limiting rotation of said track means and said arm means in a rotary direction opposite to said first rotating direction to a third position whereby said chucks are aligned with said workpiece loading-unloading station so that said workpiece gripping means of said first chuck means can unload a finished workpiece at said station.

* * * * *